(12) United States Patent
Hu et al.

(10) Patent No.: US 12,616,944 B2
(45) Date of Patent: May 5, 2026

(54) TUNABLE GRAPHENE-BASED MEMBRANES AND METHOD OF MAKING THE SAME

(71) Applicant: ORA GRAPHENE AUDIO INC., Montréal (CA)

(72) Inventors: Kaiwen Hu, Montréal (CA); Xavier Cauchy, Montréal (CA); Robert-Eric Gaskell, Montréal (CA)

(73) Assignee: ORA GRAPHENE AUDIO INC., Montréal (CA)

( * ) Notice: Subject to any disclaimer, the term of this patent is extended or adjusted under 35 U.S.C. 154(b) by 476 days.

(21) Appl. No.: 16/496,724

(22) PCT Filed: Apr. 24, 2018

(86) PCT No.: PCT/CA2018/050481
    § 371 (c)(1),
    (2) Date: Sep. 23, 2019

(87) PCT Pub. No.: WO2018/195658
    PCT Pub. Date: Nov. 1, 2018

(65) Prior Publication Data
    US 2020/0108352 A1 Apr. 9, 2020

Related U.S. Application Data

(60) Provisional application No. 62/489,335, filed on Apr. 24, 2017.

(51) Int. Cl.
    *B01D 71/02* (2006.01)
    *B01D 67/00* (2006.01)
    (Continued)

(52) U.S. Cl.
    CPC ...... *B01D 71/0211* (2022.08); *B01D 67/0039* (2013.01); *B01D 69/04* (2013.01); *B01D 69/06* (2013.01); *C01B 32/198* (2017.08)

(58) Field of Classification Search
    CPC .. B01D 71/021; B01D 67/0039; B01D 69/04; B01D 71/024; B01D 71/10;
    (Continued)

(56) References Cited

U.S. PATENT DOCUMENTS 5,792,356 A * 8/1998 Yuan ..................... B01D 29/23
                                                    210/473
8,709,213 B2 4/2014 Compton et al.
        (Continued)

FOREIGN PATENT DOCUMENTS

| CN | 104743551 | 7/2015 |
| CN | 105121336 | 12/2015 |
| CN | 106057495 | 10/2016 |

OTHER PUBLICATIONS

Ceriotti, Gabriel, et al. "Rapid method for the purification of graphene oxide." RSC Advances 5.62 (2015): 50365-50371. (Year: 2015).*
        (Continued)

*Primary Examiner* — Bradley R Spies
*Assistant Examiner* — Jeannie McDermott
(74) *Attorney, Agent, or Firm* — Norton Rose Fulbirght Canada

(57) ABSTRACT

There is provided a graphene-based membrane where the mechanical properties, thermal conductivity, electrical conductivity, and/or three-dimensional curvature of the membrane have been tuned according to the desired application of the membrane. Methods of accelerating the vacuum-assisted self-assembly (VASA) process for graphene-based membranes and methods for accelerating the process of removing liquid from a graphene-based dispersion are also provided. The method can include two steps of reduction to both minimize the filtration time and to substantially restore
        (Continued)

the electrical and thermal properties of a graphene-based membrane at low temperature.

9 Claims, 4 Drawing Sheets

(51) Int. Cl.
| | | |
|---|---|---|
| *B01D 69/04* | (2006.01) | |
| *B01D 69/06* | (2006.01) | |
| *C01B 32/198* | (2017.01) | |

(58) Field of Classification Search
CPC ............ B01D 67/0004; B01D 67/0006; B01D 67/0041; B01D 2323/21; B01D 2323/30; B01D 2325/24; B01D 2325/26; B01D 67/0083; B01D 67/0086; B01D 69/06; C01B 32/198; C01B 32/182
See application file for complete search history.

(56) References Cited

U.S. PATENT DOCUMENTS

| | | | | |
|---|---|---|---|---|
| 2006/0096263 | A1* | 5/2006 | Kahlbaugh | B01D 46/10 |
| | | | | 55/528 |
| 2010/0219151 | A1* | 9/2010 | Risheq | C02F 1/003 |
| | | | | 210/348 |
| 2011/0256376 | A1* | 10/2011 | Compton | B32B 9/04 |
| | | | | 428/411.1 |
| 2013/0065034 | A1* | 3/2013 | Muramatsu | B82Y 40/00 |
| | | | | 428/408 |
| 2013/0156678 | A1* | 6/2013 | Banerjee | H01G 11/36 |
| | | | | 204/507 |
| 2013/0256211 | A1 | 10/2013 | Fleming | |
| 2014/0235123 | A1* | 8/2014 | Lin | G06F 3/041 |
| | | | | 977/734 |
| 2016/0310908 | A1 | 10/2016 | Yu | |
| 2017/0096339 | A1* | 4/2017 | He | B01D 71/021 |
| 2017/0157570 | A1* | 6/2017 | Chu | B01D 71/0212 |
| 2017/0203255 | A1* | 7/2017 | Mundrigi | B01D 69/06 |
| 2018/0273431 | A1* | 9/2018 | Xu | H01B 1/04 |
| 2018/0319667 | A1* | 11/2018 | Kaner | B01D 21/262 |
| 2018/0360106 | A1* | 12/2018 | Chen | A24D 3/048 |
| 2019/0047864 | A1* | 2/2019 | Jayasinghe | B32B 15/043 |
| 2019/0103599 | A1* | 4/2019 | Aitchison | H01M 4/623 |
| 2020/0276543 | A1* | 9/2020 | Garaj | B01D 71/021 |

OTHER PUBLICATIONS

Tuning the grade of graphene: Gamma ray irradiation of free-standinggraphene oxide films in gaseous phase, Applied Surface Science 322 (2014) 126-135, 2014 (Year: 2014).*
Zhu et al. "Graphene and Graphene Oxide: Synthesis, Properties, and Applicantion", Adv. Mater., 2010, 22, 3906-3924.
Joshi et al. "Precise and Ultrafast Molecular Sieving Through Graphene Oxide Membranes", Science, Feb. 14, 2014 (Feb. 14, 2014), 343 (6172), 752-754.
Dikin et al., "Preparation and characterization of graphene oxide paper", Nature, 448, Jul. 26, 2007 (Jul. 26, 2007), 457-460.
Ravikumar and Scott, K. "Free standing sulfonated graphene oxide paper: a new polymer electrolyte for polymer electrolyte fuel cells". Chem. Commun., 2012, 48, pp. 5584-5586.
English Translated Abstract—CN106057495A.
English Translated Abstract—CN105121336A.
English Translated Abstract—CN104743551A.

* cited by examiner

TUNABLE GRAPHENE-BASED MEMBRANES AND METHOD OF MAKING THE SAME

CROSS-REFERENCE TO RELATED APPLICATION(S)

This application claims the benefit of priority from U.S. Provisional Patent Application No. 62/489,335 filed on Apr. 24, 2017, the entire contents of which are incorporated herein by reference.

TECHNICAL FIELD

The following relates generally to graphene-based membranes with physical properties that may be tuned during the manufacture thereof.

BACKGROUND

Graphene, in its pristine state, is a hydrophobic material. As such, modification is required to obtain stable, uniform dispersions of single graphene sheets. Such dispersions are desirable for the controlled handling of graphene-based materials. For example, the coating of a substrate with graphene material or the incorporation of graphene sheets in a polymer matrix. Among these modification methods, the oxidation of graphene sheets is a common technique known in the art. This oxidation process occurs naturally during the exfoliation of graphene sheets through widely adopted methods such as those described by Hummers et al. in *J. Am. Chem. Soc.* 1958, 80, 1339, and modifications thereof.

Graphene oxide, the result of such a modification process, includes individual graphene sheets grafted to oxygen-containing groups such as hydroxyls, carboxylic acids and epoxides. With the incorporation of the hydrophilic groups, the sheets may be readily dispersed in water upon the application of mild sonication. Vacuum filtration of such dispersions through a filter media can produce graphene oxide membranes with a highly aligned laminar structure, as described by Dikin et al. in *Nature* 2007, 448, 7152. However, the accumulation of graphene sheets during the filtration process has been found to hinder the flow of water through the filter media. This has led to dewatering times that can reach many days for 50 μm thick membranes. An example of such undesirable dewatering time can be found in U.S. Pat. No. 8,709,213 to Compton et al.

The above method has also been found to produce membranes with inconsistent mechanical properties as a result of several manufacturing factors. Furthermore, the membranes produced through this method do not share the desirable electrical or thermal properties of pristine graphene.

To recover these properties, the graphene oxide materials may undergo chemical reduction by electromagnetic or thermal reduction processes. The thermal and electromagnetic methods typically induce rapid outgassing of the oxygen species grafted to the graphene sheets. The outgassing leads to the delamination of the graphene-based membrane and ultimately results in a dramatic decrease in mechanical properties thereof. Moreover, very high temperatures are needed in order to impart the membrane with desirable electrical conductivity.

Therefore, it is an object of the following to address at least one of the above disadvantages or drawbacks.

SUMMARY OF THE INVENTION

It is recognized that there is a desire for graphene-based membranes with tunable physical properties and a method for making the same. In an example aspect, a graphene-based membrane is provided, where the mechanical properties, thermal conductivity, electrical conductivity, and/or three-dimensional curvature of the membrane have been tuned according to the desired application of the membrane.

In another aspect, methods of accelerating the vacuum-assisted self-assembly (VASA) process for graphene-based membranes and methods for accelerating the process of removing liquid from a graphene-based dispersion.

In another aspect, the method involves two steps of reduction to both minimize the filtration time and to substantially restore the electrical and thermal properties of a graphene-based membrane at low temperature.

It will be appreciated that the aspects and features described in this summary section are non-limiting and that additional features and embodiments are provided in the description and the drawings.

BRIEF DESCRIPTION OF THE DRAWINGS

Embodiments will now be described by way of example only with reference to the appended drawings wherein.

DETAILED DESCRIPTION

Figures 1A, 1B, 1C, 1D:
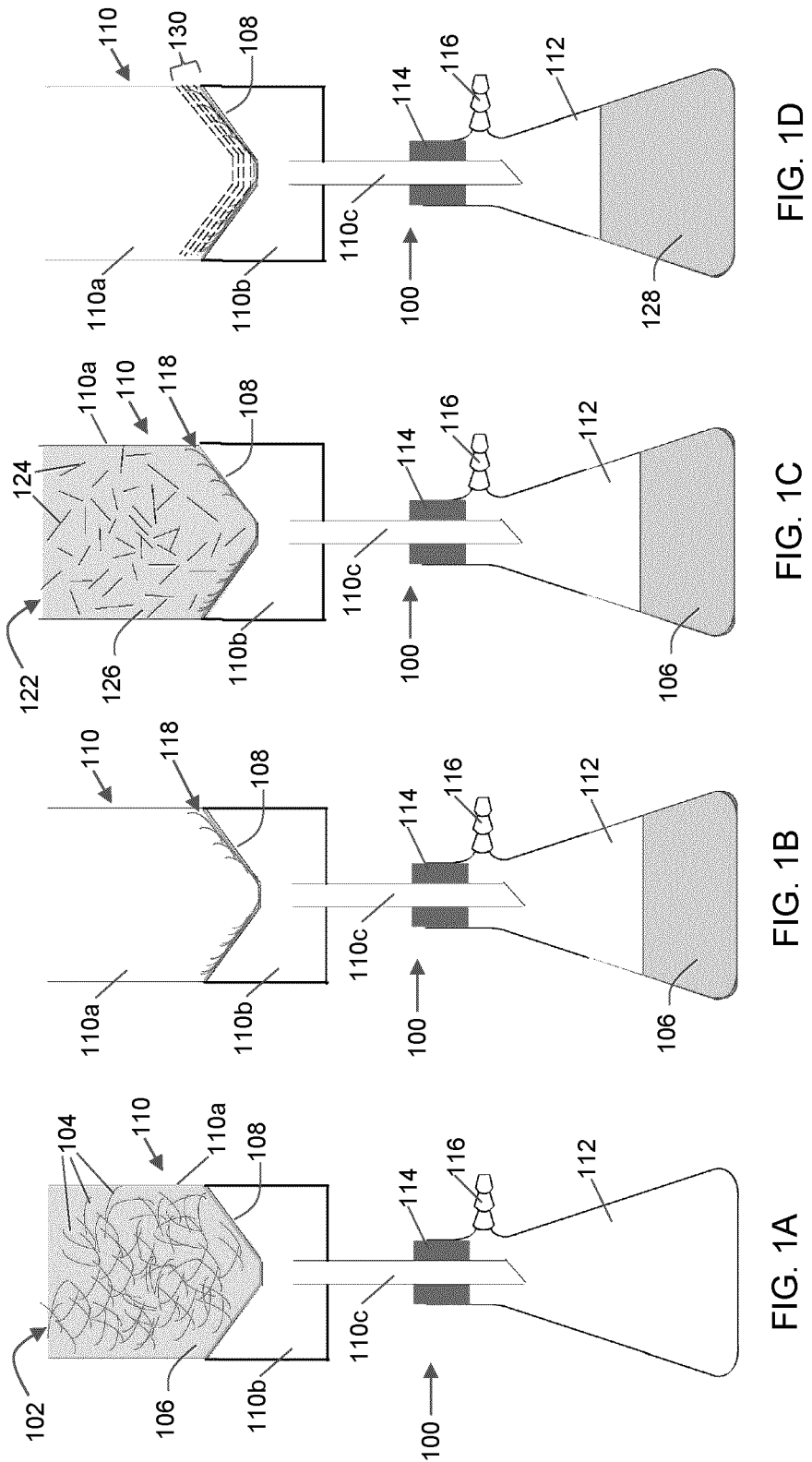
FIGS. 1A-D are a series of cross-sectional side views of the vacuum filtration process for the manufacture of a cellulose/graphene oxide (GO) composite membrane.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

Graphene-based membranes described herein are composed of at least one of graphene oxide (GO) or reduced graphene oxide (rGO). In some embodiments the membranes are composed of GO or rGO and up to 60 wt % of a filler material. The filler material can be composed of any number of materials including, but not limited to, natural polymers, synthetic polymers, inorganic fibers, and carbon nanotubes, and any combination thereof. The filler material should be substantially composed of particles with an aspect ratio greater than 10. Non-limiting examples of such filler materials include, pulp (cellulose fibers), glass fibers, polyester fibers, and pyrolytic carbon nanofibers.

In some embodiments, the graphene-based membranes contain chemical crosslinking agents. The chemical crosslinking agents provide a chemical link between individual GO sheets. Non-limiting examples of chemical crosslinking agents that may be incorporated into the membranes include sodium tetraborate, and polymeric crosslinking agents such as polycarbodiimide.

In some embodiments, the graphene-based membranes are physically cross-linked. The GO sheets can be cross-linked chemically or via physical cross-linking agents. Direct cross linking can be made by physical bonding between agents chemically attached to the adjacent GO layers and GO sheets in the same layer, such as hydroxyl or epoxy groups. Physical cross-linking agents are intercalated between GO layers and form physical bonds with at least one GO sheet at a time. Non-limiting examples of physical crosslinking agents that may be incorporated into the membranes include small polar molecules such as water, ethylene glycol, melamine, dopamine, polymers such as polyvinyl alcohol (PVA), polyethylene glycol (PEG), hydroxypropylcellulose (HPMC), carboxymethyl cellulose (CMC) and cations such as $Al^{+3}$, $Ca^{+2}$, and $Mg^{+2}$.

In some embodiments, the graphene-based membranes can further contain at least one layer of filter material. The layer of filter material can be composed of any number of materials including, but not limited to, natural or synthetic polymers, and aluminum. In some embodiments the filter layer extends past the edge of the graphene-based material.

The graphene-based membranes can exhibit a wide range of physical properties that are tuned through the manufacturing process. In some embodiments, the graphene-based membranes exhibit relatively low electrical conductivity—less than 1 S/m. In other embodiments, the graphene-based membranes exhibit relatively high electrical conductivity—greater than 4000 S/m. In some embodiments, the thermal conductivity is greater than 10 W/mK in the direction tangent to the plane formed by the membrane. The following discloses a method to produce membranes that can exhibit a wide range of physical properties. Thus, upper or lower limits of the conductivity of resulting membranes are not significant in the present disclosure. The technical significance of the present disclosure lies in the ability to manipulate or tune the membranes, during manufacture, to attain the desired properties.

Furthermore, the addition of certain filler materials may be used to decrease the density of the membranes. For example, graphene-based membranes composed of GO and 40 wt % cellulose fibers may have a density less than 1 $g/cm^3$.

The graphene-based membranes can be formed to fit a variety of shapes. They may be curved or substantially flat. The shape of the membranes are manipulated, during the manufacturing process, to comply with the intended application. The membranes can be made to a variety of thicknesses. In some embodiments, multiple membranes are stacked and subsequently bonded together to form one membrane with an overall thickness greater than the individual membranes it is composed of.

A low temperature route to efficiently produce the above mentioned tunable graphene-based membranes is described. The graphene-based membranes are synthesized by starting with at least one dispersion of GO. The at least one dispersion of GO is composed of at least GO and a solvent. It will be appreciated that one of ordinary skill in the art of the present disclosure will be capable of choosing a suitable solvent, and that various solvents can be used. Non-limiting examples of suitable solvents include, water, acetone, methanol, ethanol, 2-propanol, ethylene glycol, tetrahydrofuran, N,N-dimethylformaldehyde, chloroform, toluene, chlorobenzene, acetylacetone, diethyl ether, and other aqueous or nonaqueous solvents, and any combination thereof. The at least one dispersion of GO should be composed of 0.1 mg/mL to 50 mg/mL of GO.

In some embodiments, a weak base can be added to the at least one dispersion of GO to adjust the pH of the dispersion. At low pH, GO is known to aggregate in a variety of solvents. The addition of a weak base increases the pH of the dispersion and decreases the rate of aggregation. A suitable amount of weak base can be added to adjust the pH of the at least one GO dispersion within the range from 8 to 10, preferably within the range from 8 to 9 and most preferably within the range from 8.3 to 8.5.

To obtain a uniform dispersion, the at least one GO dispersion undergoes at least 5 minutes of exfoliation. In some embodiments, exfoliation of GO is performed by submersing a vial containing the dispersion in an ultrasonication bath. In another embodiment, exfoliation may be performed by a sonication probe, inserted directly into the dispersion. These embodiments are just two examples of how exfoliation may be performed and are not intended to limit the scope of the present disclosure. One of ordinary skill in the art may use any exfoliation technique known to disperse the GO in the at least one GO dispersion.

In some embodiments, the at least one GO dispersion is partially reduced before forming the membrane. Partial reduction is performed by exposing the GO dispersion to a reducing agent at an elevated temperature for a short period of time. In a preferred embodiment, the at least one GO dispersion is partially reduced by adding ascorbic acid such that the dispersion contains 8 mM thereof. The at least one dispersion is stirred for at least 5 minutes and then brought to a reaction temperature of 90° C. where it is again stirred for another 5 minutes before being cooled back to room temperature.

The reducing agent used in the above process can be any number of chemicals that may reduce the graphene oxide. Examples of such reducing agents include, but are not limited to: acids including a halogen element such as HI, HBr, and HCl, and mixtures thereof, organic acids such as acetic acid, carbonic acid, formic acid, benzoic acid, and ascorbic acid.

The initial dispersion with the reducing agent is stirred for greater than 5 minutes to ensure sufficient mixture. The reaction between the graphene oxide and the reducing agent may be performed at a temperature of 10° C. or more. Preferably, the reaction may be performed at a temperature of 10° C. to 120° C. It may be noted that the reduction reaction of the graphene oxide effectively occurs at a high temperature. Thus, an upper limit of the reaction temperature is not significant in the present disclosure. More significant is a lower limit of the reaction temperature. However, lower temperature of reaction results in slower rate of reaction.

In some embodiments, the at least one GO dispersion is made viscous or gelled before forming the membrane. Gelled GO dispersions have been shown to decrease the dewatering time required in the membrane forming process. The GO in the gelled dispersion has a more crosslinked structure then the less viscous dispersion. As such, they form a more porous and wrinkled film when deposited, allowing more channels for solvent to flow through. The at least one GO dispersion is gelled by exposing said dispersion to an elevated temperature for a period of time. The temperature and length of exposure time can be optimized by one skilled in the art of the present disclosure. For example, in one embodiment, a 5 mg/mL GO dispersion (in water) is gelled by heating said dispersion in an oven at 80° C. for 72 hours.

In some embodiments, filler material is added to the at least one GO dispersion. In some embodiments the filler material is another dispersion. In such embodiments filler materials, described previously, may be dispersed in a suitable solvent forming a filler dispersion. Filler material, dispersed in solvent or otherwise, is added to the at least one GO dispersion such that the resulting membrane will be composed of less than 60 wt % filler material. In other embodiments, at least one precoat layer of filler material is formed and then the at least one GO dispersion is added on top to form the graphene-based membrane.

A vacuum assisted self-assembly (VASA) process is used to form the graphene-based membrane. In one embodiment, to produce a graphene-based membrane, the GO dispersion is subjected to continuous vacuum-assisted filtration through a filter such that the GO sheets are assembled as a membrane on the filter by directional flow of the fluid of the GO dispersion through the filter. In another embodiment, the GO and filler mixture is subjected to continuous vacuum-assisted filtration through a filter so that the GO sheets and filler material are assembled as a membrane on the filter by directional flow of the fluid of the mixture through the filter.

In another embodiment, the filler material is first subjected to continuous vacuum-assisted filtration through a filter so that the filler material is assembled as a precoat layer on the filter by directional flow of the fluid of the filler dispersion through the filter. The GO dispersion is then added on top of the precoat layer and is subjected to continuous vacuum-assisted filtration through the precoat layer and filter so that the GO sheets are interspersed throughout the precoat layer and together they form a membrane on the filter by directional flow of the fluid of the GO dispersion therethrough.

The filler material serves multiple purposes for the manufacture of the graphene-based membranes and improves the tunability thereof. In one aspect, the high aspect ratio filler particles promote solvent flow through the membranes as they form. GO forms ordered stacks of sheets above the filter as solvent flows therethrough, these ordered stacks inhibit the flow of solvent from the dispersion and cause extended drying times. The addition of high aspect ratio filler particles provides a path for the solvent to flow through the membrane as it forms. This can substantially reduce the drying time and improves the efficiency of the manufacturing process.

In another aspect, the addition of filler materials can alter the mechanical properties of the resulting graphene-based membranes.

Referring now to FIGS. 1A-D, an exemplary GO/cellulose filtration process is shown. An exemplary filtration apparatus 100 is composed of a filter 108, a funnel 110, a flask 112, an elastomeric stopper 114, and an outlet 116. For simplicity, the funnel may be divided into an upper funnel body 110a, a lower funnel body 110b, and a spout 110c. The stopper 114 is inserted into the mouth of the flask 112. The spout 110c is inserted into a hole in the center of the stopper 114 such that the spout 110c protrudes into the flask 112. Upon application of a vacuum, the stopper 114 seals the area between the spout 110c and the side wall at the mouth of the flask 112. The filter 108 is placed into the funnel 110 defining the upper funnel body 110a as the space above the filter 108 and the lower funnel body 110b as the space below the filter 108. The outlet 116 is connected to a vacuum that provides reduced pressure in the flask 112 via a hose (not shown).

While the filter 108 is shown in a substantially conical geometry, this is just one of many possible shapes. One of ordinary skill in the art of the present disclosure will appreciate that the shape of the filter 108 can be selected for the intended application of the resulting graphene-based membrane. It will also be appreciated that the filtration apparatus 100 presented in the figures is just one exemplary embodiment of such a device and any number of vacuum filtration set ups known in the art may be used.

Referring now specifically to FIG. 1A, a cellulose dispersion 102 of cellulose fibers 104 and solvent 106 is added to the upper funnel body 110a. Upon application of the vacuum, the interior of the flask 112 is held at a pressure lower than the atmospheric pressure present above the dispersion 102 in the funnel 110. This pressure gradient will induce the flow of the solvent 106 through the filter 108 where it then exits the funnel 110 and is captured in the flask 112 (as shown in FIG. 1B).

FIG. 1B shows the formation of a precoat layer 118 of cellulose fibers 104 atop the filter 108 after the solvent 106 has been evacuated from the funnel 110 and into the flask 112. Then, in FIG. 10, a GO dispersion 122 of GO sheets 124 and solvent 126 is added to the upper funnel body 110a. Upon application of the vacuum, the interior of the flask 112 will be held at a pressure lower than the atmospheric pressure present above the GO dispersion 122 in the funnel 110. This pressure gradient between the funnel 110 and flask 112 will induce the flow of the solvent 126 through the precoat layer 118 and filter 108 where it passes through the precoat layer 118 and filter 108 and is captured in the flask 112 (as shown in FIG. 1D).

FIG. 1D shows the formation of a GO/cellulose membrane 130 composed of cellulose fibers 104 and GO sheets 124 after the solvent 126 has drained from the funnel 110 and into the flask 112. In this exemplary embodiment, the solvent 106 from the cellulose dispersion 102 was not removed from the flask 112 and thus the solvent 126 from the GO dispersion 122 mixed with the cellulose solvent 106 upon entering the flask 112 and formed a solvent mixture 128 that may be disposed through safe practices known in the art upon completion of the filtration process.

Figure 2:
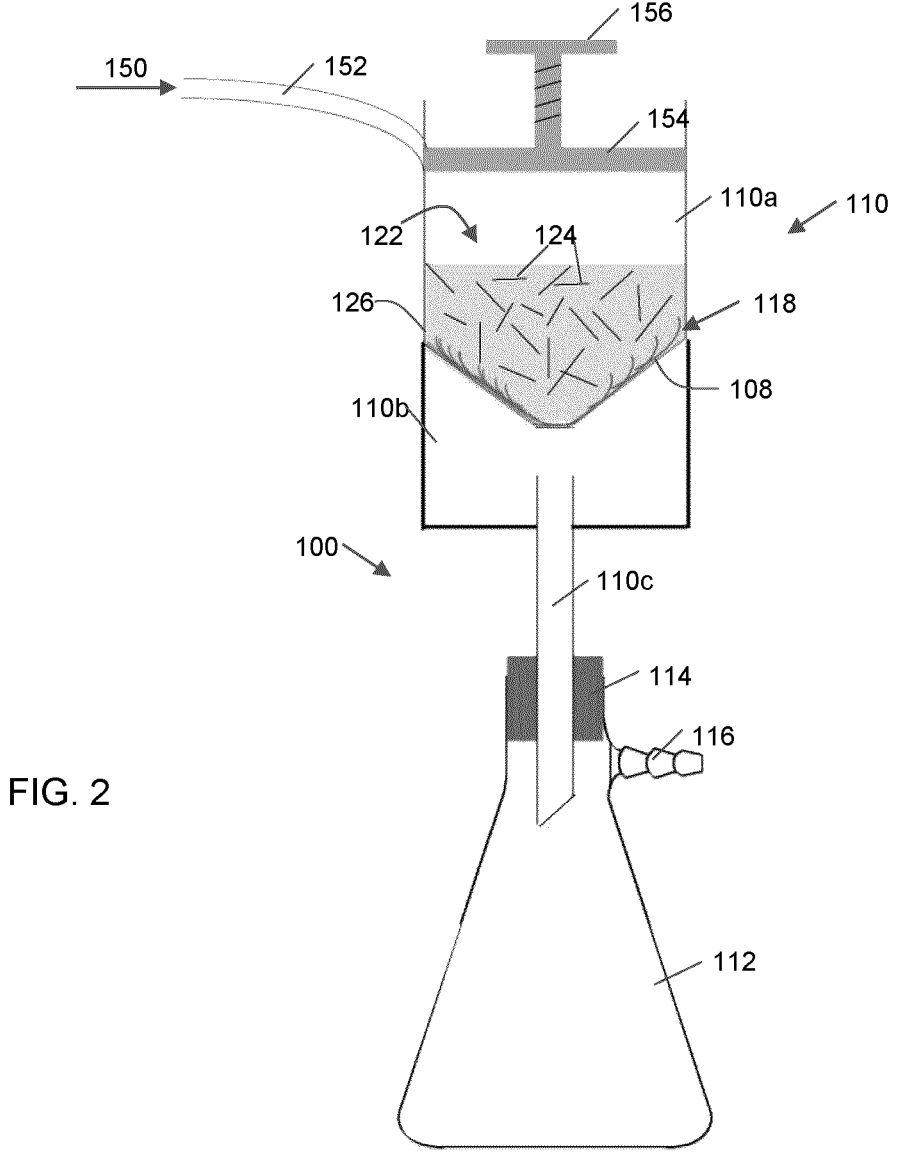
FIG. 2 is a cross-sectional side view of the pressure assisted vacuum filtration process for the manufacture of a cellulose/GO composite membrane.
Figures 3A, 3B, 3C:
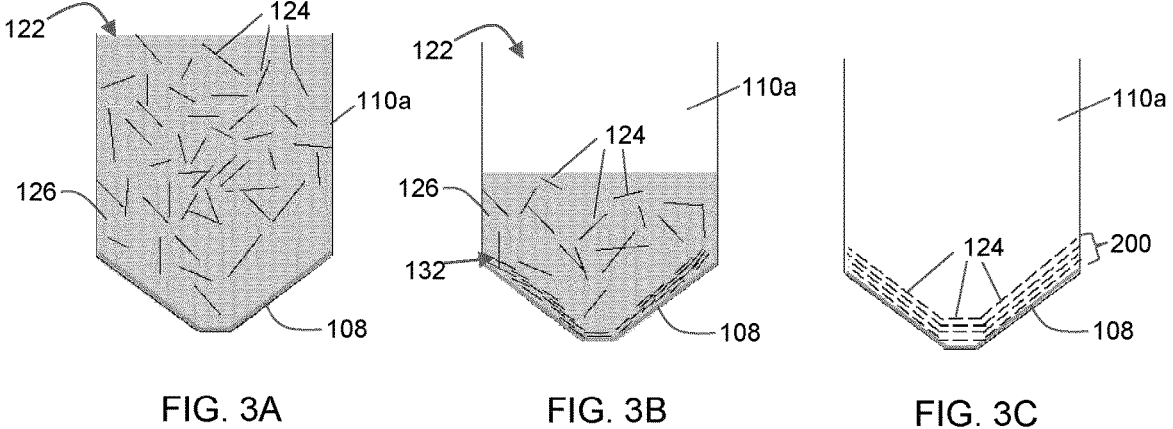
FIGS. 3A-C are a series of cross-sectional side views of the vacuum filtration process for the manufacture of a GO membrane.
Figures 4A, 4B, 4C:
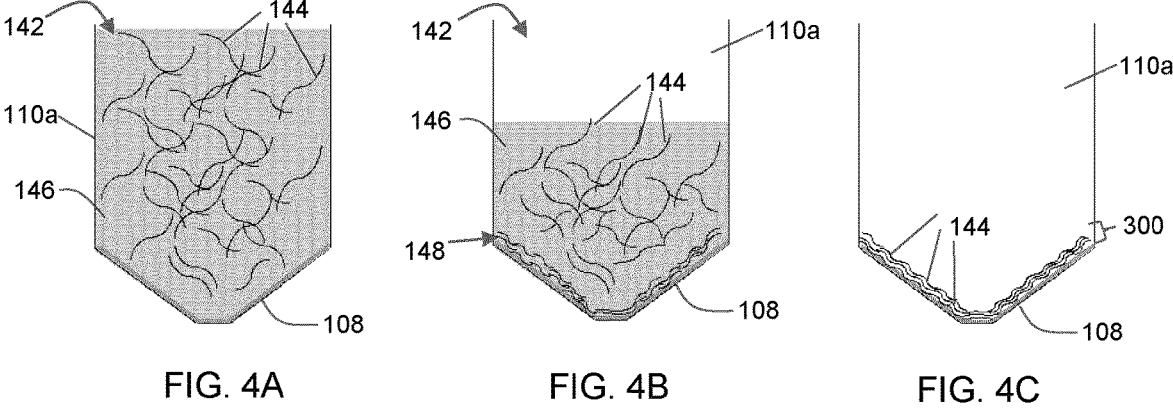
FIGS. 4A-C are a series of cross-sectional side views of the vacuum filtration process for the manufacture of a gelated GO membrane.
Figures 5A, 5B, 5C:
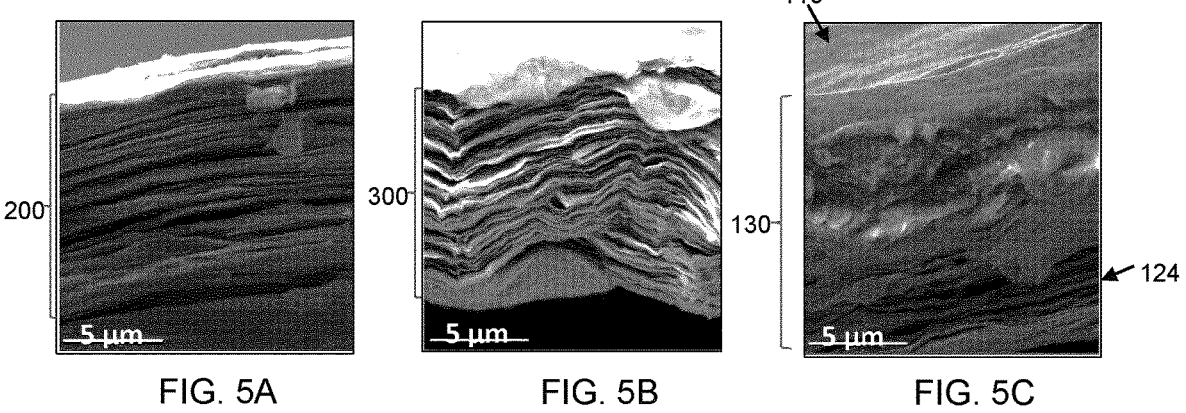
FIG. 5A is an electron micrograph of a partially-reduced GO membrane.
FIG. 5B is an electron micrograph of a partially-reduced gelated GO membrane.
FIG. 5C is an electron micrograph of a partially-reduced cellulose/GO composite membrane.

In some embodiments, positive pressure may be added to the chamber above the forming membrane. Referring now to FIG. 2, an exemplary pressure assisted filtration process is shown. In this exemplary embodiment, compressed air is pumped through a hose 152 in the direction of arrow 150. The compressed air flows through the hose 152 to the upper funnel body 110a. A lid 154 seals the funnel 110 such that the pressure in the upper funnel body 110a above the GO dispersion 122 increases above atmospheric pressure. The pressure inside the funnel can be monitored by a standard pressure gauge 156. The application of this pressure has been found to improve the conformity of the resulting membrane to the shape of the filter.

In other embodiments, the flow of the fluid out from the forming membrane is increased by applying at least one of the following: ultrasound, heat, pulsed vacuum, and pulsed pressure.

In some embodiments, the vacuum is applied parallel to the stacking of sheets rather than perpendicular. In such embodiments, the parallel vacuum is applied when the membrane has been sufficiently formed but is still wet. By applying the vacuum parallel to the stacking of the sheets, it will be easier for the fluid to flow out of the membrane as it will face less impedance from the GO sheets.

In some embodiments, an additional filler layer is added on top of the graphene-based layer. The additional filler material is subjected to continuous vacuum-assisted filtration through the forming membrane so that the filler material is assembled as a layer on the forming membrane by directional flow of the fluid of the filler dispersion through the lower membrane layers.

For embodiments that do not involve precoat layers, the filter has a mean porosity size of less than 1 μm. One skilled in the art of the present disclosure will be able to choose a suitable membrane filter, however, ceramic frit filters, known in the art, are preferred for embodiments without precoat layers. For those embodiments that contain precoat layers, larger filter pores are allowable. For example, for embodiments with cellulose fiber precoat layers, the mean porosity size of the filter is less than 5 μm. It will be appreciated that one of ordinary skill in the art of the present disclosure will be able to select a suitable filter for the intended application. One of ordinary skill in the art of the present disclosure would be aware of the size of filler particles and select a filter that would limit their passing therethrough.

In some embodiments, after the vacuum filtrations step, the filter shall become an integral member of the membrane. For example, the GO sheets can become embedded in a cellulose precoat and the final membrane is a combination of cellulose and GO. In another example, a thin Al filter is used. After filtration, the thin Al filter is impregnated with GO sheets and together they form the graphene-based membrane.

In other embodiments an adhesive may be used to combine multiple membranes to form substantially one membrane. For example, a thin layer of Al may be adhered to a graphene-based membrane with an adhesive.

In some embodiments, the graphene-based membrane shall then be transferred from the vacuum filtration apparatus to a heated press. The heated press is used to at least partially reduce the GO sheets and to further dry the graphene-based membrane following filtration. The press is configured such that it presses the graphene-based membrane to the intended shape.

The press, which presses and heats the graphene-based membrane, includes a lower die and an upper die. The upper and lower dies are configured to conform to the intended shape of the graphene-based membrane. In one embodiment, the lower die has a protrusion which protrudes from the forming surface thereof, and the upper die has a recess corresponding to the protrusion. In another embodiment, the upper die has a protrusion which protrudes from the forming surface thereof, and the lower die has a recess corresponding to the protrusion. When the graphene-based membrane is desired to be substantially flat, both the upper and lower dies form substantially flat plates. The membrane is placed on the lower die and the two die are brought into contact, applying pressure on both surfaces of the graphene-based membrane.

A pressure greater than 5 MPa, most preferably greater than 10 MPa is applied to the graphene-based membrane at a temperature greater than 50° C. It may be noted that the reduction reaction of the graphene oxide effectively occurs at a high temperature. Thus, an upper limit of the reaction temperature is not significant in the present disclosure. As indicated above, more significant is a lower limit of the temperature. The production process of the present disclosure can be performed at a relatively low temperature of 50°

C. Thus, the present disclosure is advantageous in mass producing reduced or partially-reduced GO composite films at a low temperature. Temperatures of greater than 150° C. are preferred for graphene-based membranes where pristine graphene properties are desired. More preferable are temperatures greater than 200° C. for graphene-based membranes where pristine graphene properties are desired.

The pressure is applied to reduce the impact of degassing during the thermal reduction process. It has been found that the addition of pressure helps to maintain the mechanical properties, such as the Young's modulus of the resulting membrane. The applied pressure suppresses the volume expansion of the stacked GO sheets during heating.

In some embodiments, multiple graphene-based membranes may be combined to form substantially one membrane. For example, graphene-based membranes prepared through the above mentioned processes may be stacked and then pressed using a steam press or a heated press to form substantially one membrane.

The following EXAMPLEs are offered to further illustrate the above-described principles, without limitation.

Example 1

Manufacture of rGO Membrane

An aqueous dispersion of GO sheets was adjusted to a pH of 8.4 by adding 20 μL of ammonia solution (20-30 wt %). A stable water dispersion was prepared by exfoliation of the GO (1 mg/mL) via room temperature ultrasonic treatment (5 minutes in a 483 W ultrasonic bath). The dispersion of GO sheets was partially reduced with 8 mM ascorbic acid as a reducing agent at 90° C. under constant stirring for 5 minutes. The ascorbic acid was added to the dispersion before commencing stirring and was then stirred for 5 minutes before commencing the heating. Partial reduction of the graphene oxide sheets occurs in the solution, and the reaction is stopped by cooling the dispersion to room temperature. The cooled dispersion is immediately poured into a vacuum filtration apparatus for dewatering.

The dispersion of partially reduced GO sheets is filtered through a ceramic frit filter with 500 nm mean porosity size, the surface of which mimics the shape of the desired membrane. Vacuum is applied for 2 to 8 hours or until no water remains. The shaped filter is transferred to a heated press where a die shaped in the filter media negative geometry is used to compress the dewatered graphene-based material. A pressure of 10 MPa is applied to the material at a temperature of 200° C. for 15 minutes while the remaining water evaporates and the graphene oxide sheets are reduced.

The electrical conductivity of the resulting GO membrane before heat pressing is 0.005 S/m. Following the pressure assisted thermal reduction process the resulting rGO membrane has an electrical conductivity of 4600 S/m—closer to pristine graphene.

This example demonstrates how the thermal reduction process outlined above can be used to tune the conductivity of the resulting graphene-based membranes.

Example 2

Manufacture of Cellulose/rGO Composite Membrane with Gelated GO

A 5 mL dispersion of viscous/gelated GO sheets (5 mg/mL) was prepared via heating an aqueous GO dispersion in an oven at 80° C. for 3 days.

A second dispersion containing 8.33 mL (25 wt % cellulose composite) softwood kraft pulp at a 0.1 wt % concentration was prepared.

In a first filtration step, the kraft pulp was poured in the filtration apparatus and vacuum was applied to the filtrate side. The fully dewatered pulp yielded a pre-coat of high aspect ratio tubular particles. The filter media was a 5 μm nominal porosity metallic mesh, the surface of which mimics the shape of the desired part.

In a second step, the gelated graphene oxide dispersion was added to the filter apparatus while vacuum was maintained on the filtrate side. The feed side was then pressurized via addition of compressed air to force the solvent through the filter media. Vacuum was applied until no water remains.

The shaped filter media was transferred to a heated press where a die shaped in the filter media negative geometry was used to compress the dewatered graphene material. A pressure of 10 MPa was applied to the material at a temperature of 100° C. for 15 minutes while the remaining water evaporated and the graphene oxide was partially reduced. In this embodiment, the electrical conductivity of the finished product had a value of 0.6 S/m.

Example 3

Manufacture of Carbon Nanofiber/rGO Composite Membrane

A 100 mL solution of a 0.5 wt % GO solution was split into two vials. In the first vial 8.3 mL of a 0.1 M solution of sodium tetraborate (anhydrous) was added and the resulting dispersion was stirred for 5 minutes.

The dispersion of GO sheets in the second vial was partially reduced with 70 mg of ascorbic acid as a reducing agent at 90° C. under constant stirring for 5 minutes. The ascorbic acid was added to the dispersion before commencing stirring and was then stirred for 5 minutes before commencing the heating. Partial reduction of the graphene oxide sheets occurs in the solution, and the reaction was stopped by cooling the dispersion to room temperature.

The two dispersions were then combined along with a 20 mL dispersion containing 1 wt % pyrolytic carbon nanofibers. The resulting dispersion was poured in the pressurized chamber of a filtration apparatus, wherein the pressure chamber was separated from the vacuum chamber by a porous frit of a functional shape. A 120 Psi relative pressure was applied on the feed side and a 0.5 Atm partial vacuum was applied on the filtrate side to dewater the mixture.

When completely dewatered, the solids in the mixture were deposited on the frit surface, thus mimicking its shape. The pressure gradient was then removed and the frit was transferred to a hydraulic press where a negative die heated to 200° C. and a pressure of 20 MPa was applied to the dewatered solids. A 200 μm thick, 25 cm² composite membrane was obtained with graphene sheets intercalated with carbon nanofibers.

Figure 6:
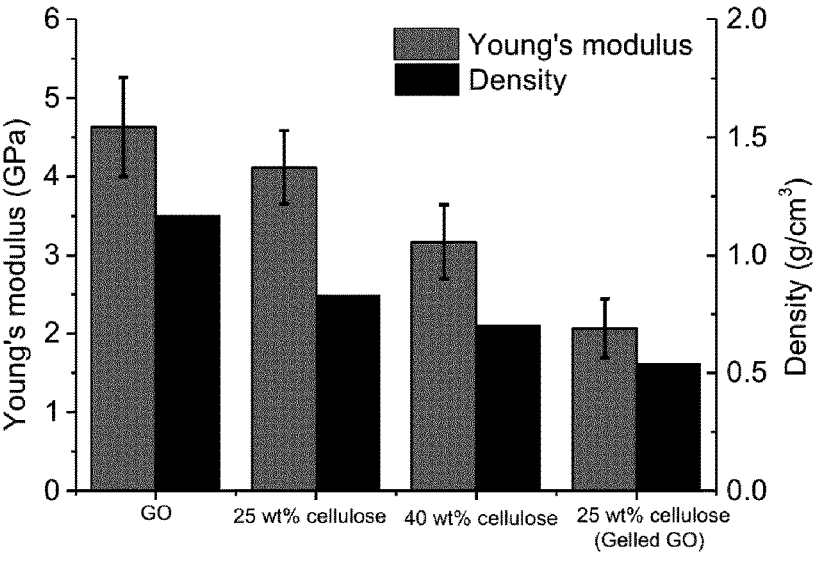
FIG. 6 represents an analysis showing the density and Young's modulus of graphene-based membranes of various compositions.

Referring now to FIG. 6, a representation of an analysis showing the density and Young's modulus of graphene-based membranes of various compositions is shown. The various membrane compositions are indicated on the x-axis of the chart. All graphene-based membranes represented in FIG. 6 were subjected to a thermal reduction process at 90° C. and 10 MPa. FIG. 6 demonstrates that the Young's modulus increases with the density of the membranes. Furthermore, the addition of filler (in this example, cellulose) leads to decreasing density and therefore decreased Young's modulus. The use of gelled GO further reduces the density of the membrane and therefore the Young's modulus.

FIG. 6 provides some examples of how the physical properties of the graphene-membranes may be manipulated to suit particular applications.

Although the above has been described in detail with respect to certain embodiments, those skilled in the art will appreciate that the invention is not limited to these embodiments and that changes, modifications and the like can be made therein without departing from the scope of the appended claims.

The invention claimed is:

1. A method of forming a graphene-based membrane, the method comprising:
   a) obtaining a dispersion comprising graphene material dispersed within a solvent, the graphene material having at least one of graphene oxide and reduced graphene oxide; and
   b) filtering the dispersion through a filter membrane supported by a porous funnel having a tridimensional curved shape and giving the filter membrane a tridimensional curved geometry corresponding to the porous funnel's geometry, said filtering including the solvent flowing through the filter membrane, thereby forming the graphene-based membrane, the graphene-based membrane having a tridimensional curved shape mimicking the tridimensional curved geometry of the filter membrane,
   wherein the filtering of the dispersion is performed by a pressure assisted vacuum filtration including
      pumping compressed air to apply a positive pressure on the feed side of the filter membrane, the positive pressure being above atmospheric pressure, and
      applying a vacuum on the filtrate side of the filter membrane, the vacuum being below atmospheric pressure, and
   wherein the graphene-based membrane has a thickness greater than 5 μm.

2. The method of claim 1 wherein the tridimensional curved geometry of the filter membrane has a conical geometry, the tridimensional curved shape of the graphene-based membrane having a corresponding conical geometry.

3. The method of claim 2 wherein the tridimensional curved geometry of the filter membrane has a truncated conical geometry, the tridimensional curved shape of the graphene-based membrane having a corresponding truncated conical geometry.

4. The method of claim 1, wherein the graphene-based membrane comprises at least one of the graphene oxide and the reduced graphene oxide.

5. The method of claim 4, wherein the filter membrane is selected from natural polymers, synthetic polymers, inorganic fibers, carbon nanotubes, and any combination thereof.

6. The method of claim 1, further comprising exfoliating the dispersion to obtain a uniform dispersion.

7. The method of claim 4, wherein the graphene-based membrane further comprises up to 60 wt. % of a filler material.

8. The method of claim 7, further comprising before filtering the dispersion, forming a precoat layer of filler material by filtering a dispersion of the filler material through the filter membrane.

9. The method of claim 8, wherein the filler material is selected from cellulose fibers, polyester fibers, glass fibers, carbon nanofibers and combinations thereof.

\* \* \* \* \*